(12) United States Patent
Iida (10) Patent No.: US 6,341,489 B1
(45) Date of Patent: Jan. 29, 2002

(54) AXLE DRIVING APPARATUS

(75) Inventor: Masaru Iida, Amagasaki (JP)

(73) Assignee: Kanazaki Kokyukoki Mfg. Co., Ltd. (JP)

( * ) Notice: Subject to any disclaimer, the term of this patent is extended or adjusted under 35 U.S.C. 154(b) by 0 days.

(21) Appl. No.: 09/481,703

(22) Filed: Jan. 12, 2000

(30) Foreign Application Priority Data

Jan. 12, 1999 (JP) .......................................... 11-005172

(51) Int. Cl.[7] .............................................. F16D 39/00
(52) U.S. Cl. ....................................................... 60/487
(58) Field of Search ................................. 60/487, 464

(56) References Cited

U.S. PATENT DOCUMENTS

| | | | |
|---|---|---|---|
| 5,259,194 A | 11/1993 | Okada | 60/456 |
| 5,440,951 A | 8/1995 | Okada et al. | 60/456 |
| 5,644,954 A | 7/1997 | Matsufuji | 74/606 R |
| 5,799,486 A | * 9/1998 | Takada et al. | 60/487 |
| 5,809,845 A | 9/1998 | Shimizu | 60/454 |
| 6,233,929 B1 | * 5/2001 | Okada et al. | 60/487 |

FOREIGN PATENT DOCUMENTS

JP    H3-159822    7/1991

* cited by examiner

Primary Examiner—Edward K. Look
Assistant Examiner—Thomas E. Lazo
(74) Attorney, Agent, or Firm—Sterne, Kessler, Goldstein & Fox (57) ABSTRACT

An axle driving apparatus including a housing which houses a hydrostatic transmission (HST), an axle having a lateral axis of rotation, and a transmitting mechanism for transmitting power from the HST to the axle. A first oil sump and a second oil sump are formed in the housing. The HST is disposed in the first oil sump. The axle and the transmitting mechanism are disposed in the second oil sump. An oil passage is interposed between the first and second oil sumps, so as to make oil flow from the upper portion of the first oil sump to the second oil sump therethrough when the oil in the first oil sump is expanded over the volume of the first oil sump. Also, the first oil sump is separated from the outside air, and the second oil sump is communicated with the outside air. One open end of the oil passage, which is open to the first oil sump, is disposed above the oil level of the second oil sump, and the other open end thereof, which is open to the second oil sump, is disposed below the oil level of the second oil sump.

8 Claims, 7 Drawing Sheets

AXLE DRIVING APPARATUS

BACKGROUND OF THE INVENTION

1. Field of the Invention

The present invention relates to an axle driving apparatus including a hydrostatic transmission (HST), an axle, and a transmitting mechanism for transmitting power from the HST to the axle, all of which are integrally provided in a housing of the axle driving apparatus. More particularly, two oil sumps separated by a partition are disposed in a housing. The HST is disposed in one of the oil sumps and the axle and so on are disposed in the other oil sump. When the volume of the oil sump fluctuates due to changes of the HST, oil is given to and received from the other oil sump, Therefore, the oil sump that houses the HST is supplied with oil with stability without a reservoir tank.

2. Related Art

There has been a well-known conventional axle driving apparatus including an HST hydraulically interconnecting a pump and a motor. Axles and a transmitting mechanism (including a differential gear) connect the HST to the axles together housed in a housing, wherein, as disclosed in JP Laid Open No. H3-159822, for example, two oil sumps have been formed in the housing so that the HST has been immersed in one of the oil sumps and the axles and the transmitting mechanism have been immersed in the other oil sump. In this regard, the volume of oil in the housing necessarily changes according to driving of the HST or change of oil temperature, thereby requiring an oil reservoir tank to accommodate the increased oil in the housing, which has been usually disposed above the housing.

Because of the reservoir tank projecting upwardly from the housing, the conventional apparatus has required large vertical space for its installation onto a vehicle, thereby making the vehicle rather tall. When the vehicle is designed like this, it becomes somewhat difficult for an operator to get on and off the vehicle, or its center of gravity is positioned unstably high.

For example, a lawn tractor having a mower disposed on the lower portion of a chassis between a front and a rear wheel and a grassbox disposed on the rear portion of the vehicle is well-known. On this tractor, a duct is disposed for sending grass rearwardly into the grassbox for collecting therein. Then, when a conventional axle driving apparatus, described above, is mounted onto the axle of the rear wheels of the lawn tractor, it is necessary to place the axle driving apparatus on the upper portion of the tractor and to extend the duct under the axle driving apparatus. In sum, there has been the problems that the reservoir tank, which is mounted on the top of housing of the axle driving apparatus, interferes with the chassis, and the arrangement and size of the duct is restricted.

SUMMARY OF THE INVENTION

Accordingly, it is a primary object of the present invention is to provide an axle driving apparatus, comprising an HST; an axle having a lateral axis of rotation; and a transmitting mechanism for transmitting power from a hydraulic motor of the HST to the axle, housed together in a housing forming an oil sump therein wherein the oil sump, in which the HST is disposed, is supplied with oil with stability by a compact oil-supplying construction without a reservoir tank.

To attain the primary object, the housing includes a first oil sump and a second oil sump. The HST is disposed in the first oil sump. The axle and the transmitting mechanism are disposed in the second oil sump and a communication means is disposed between the first oil sump and the second oil sump. The communication means makes oil flow therethrough from the first oil sump to the second oil sump when oil in the first oil sump is expanded beyond the volume of said first oil sump.

In a first construction, the first oil sump is separated from the outside air, the second oil sump is communicated with the outside air, a first open end of the communication means communicates with the first oil sump and is disposed above the oil level of the second oil sump. A second open end of the communication means communicates with the second oil sump and is disposed below the oil level of the second oil sump.

In the first construction, a partition is formed in the housing for separating the first oil sump and the second oil sump from each other. A third oil sump constitutes a part of the communication means and is formed in the housing above the partition. A conduit constitutes a part of the communication means and extends in the oil second sump from the third oil sump, so that a lower end of the conduit is defined as the second opening end of the communication means.

Alternatively, in the first construction, a partition is formed in the housing for separating the first oil sump and the second oil sump from each other. An oil passage is bored through the partition for constituting the communication means. The oil passage has vertical difference between its both open ends, so that an upper open end of the oil passage is defined as the first opening end of the communication means and a lower open end of the oil passage is defined as the second opening end of the communication means.

In a second construction, the first oil sump is separated from the outside air, and the second oil sump is communicated with the outside air. A partition is formed in the housing for separating the first oil sump and the second oil sump from each other, A first check valve is disposed at an opening end of the communication means communicating with the first oil sump for enabling oil to flow only from the first oil sump to the second oil sump. A second check valve is disposed between the first oil sump and second oil sump through the partition for enabling oil to flow only from the second oil sump to the first oil sump. The second check valve is disposed below the oil level in the second oil sump.

In a third construction, a partition is formed in the housing for separating the first oil sump and the second oil sump from each other. A clearance, formed in the housing above the partition, constitutes the communication means so as to make the first oil sump and the second oil sump communicating with each other therethrough. A check valve is disposed through the partition between the first oil sump and the second oil sump. The check valve enables oil to flow only from the second oil sump to the first oil sump, and the check valve is placed below the oil level in the second oil sump.

DETAILED DESCRIPTION OF THE PREFERRED EMBODIMENTS

With the above mentioned and other objects in mind, the scope of the present invention includes the construction fully described below, illustrated in the accompanying drawings, and set forth in the appended claims. It is understood that various change in the operation, form, proportion and minor details of construction, within the scope of the claims, may be modified without departing from the sprit of the present invention or sacrificing any of the advantages thereof.

Figure 1:
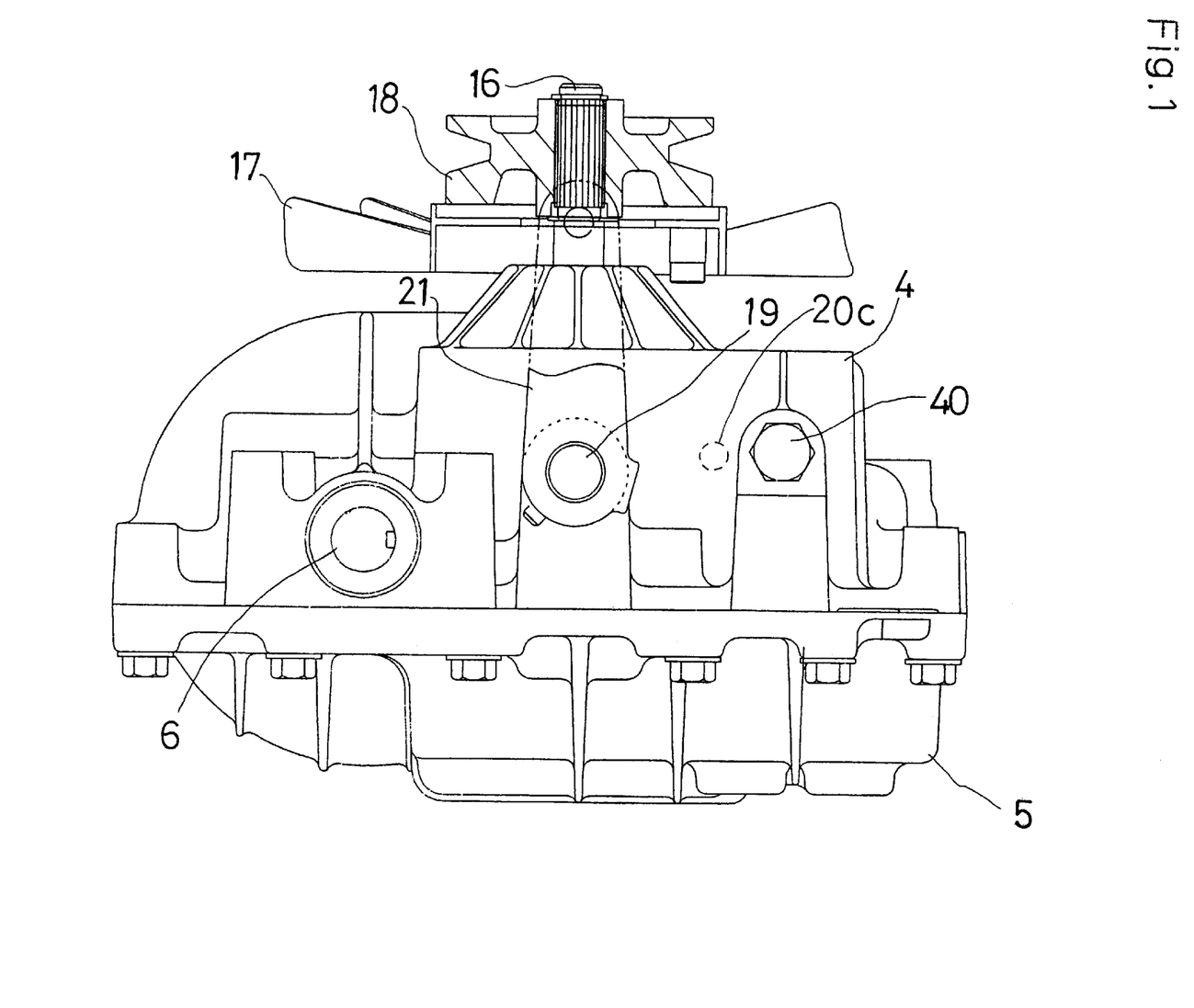
FIG. 1 is a side view of an axle driving apparatus of the present invention.

Description will be given on the entire construction of the axle driving apparatus of the present invention with reference to FIGS. 1 and 2. A housing of axle driving apparatus includes an upper housing member 4 and a lower housing member 5, which are vertically separably joined to one another through their horizontal flat joint surfaces. Laterally disposed axles 6 and 6, and a motor shaft 7 are rotatably supported in a housing,. The inner ends of axles 6 and 6 are differentially connected with each other through a differential gearing 8. Both outer ends of axles 6 and 6 project outwardly from upper housing member 4.

A first oil sump 1 filled with oil for operating an HST and lubrication is formed in the housing. A pump 9 and a motor 10 of the HST and a center section 11 hydraulically connecting pump 9 and motor 10 are disposed in first oil sump 1.

Also, in the housing is formed a second oil sump 2 in an L-like shape, when viewed in plan. A partition 45 is formed of housing members 4 and 5 so as to separate second oil sump 2 from first oil sump 1. L-like second oil sump 2 has a laterally expanded portion and a longitudinally expanded portion. In the laterally expanded portion of second oil sump 2 are disposed axles 6 and differential gearing 8. In the longitudinal expanded portion of the same is disposed a transmitting mechanism comprising gears 12a and 12b and so on, for transmitting driving power from motor shaft 7 to differential gearing 8.

Figure 2:
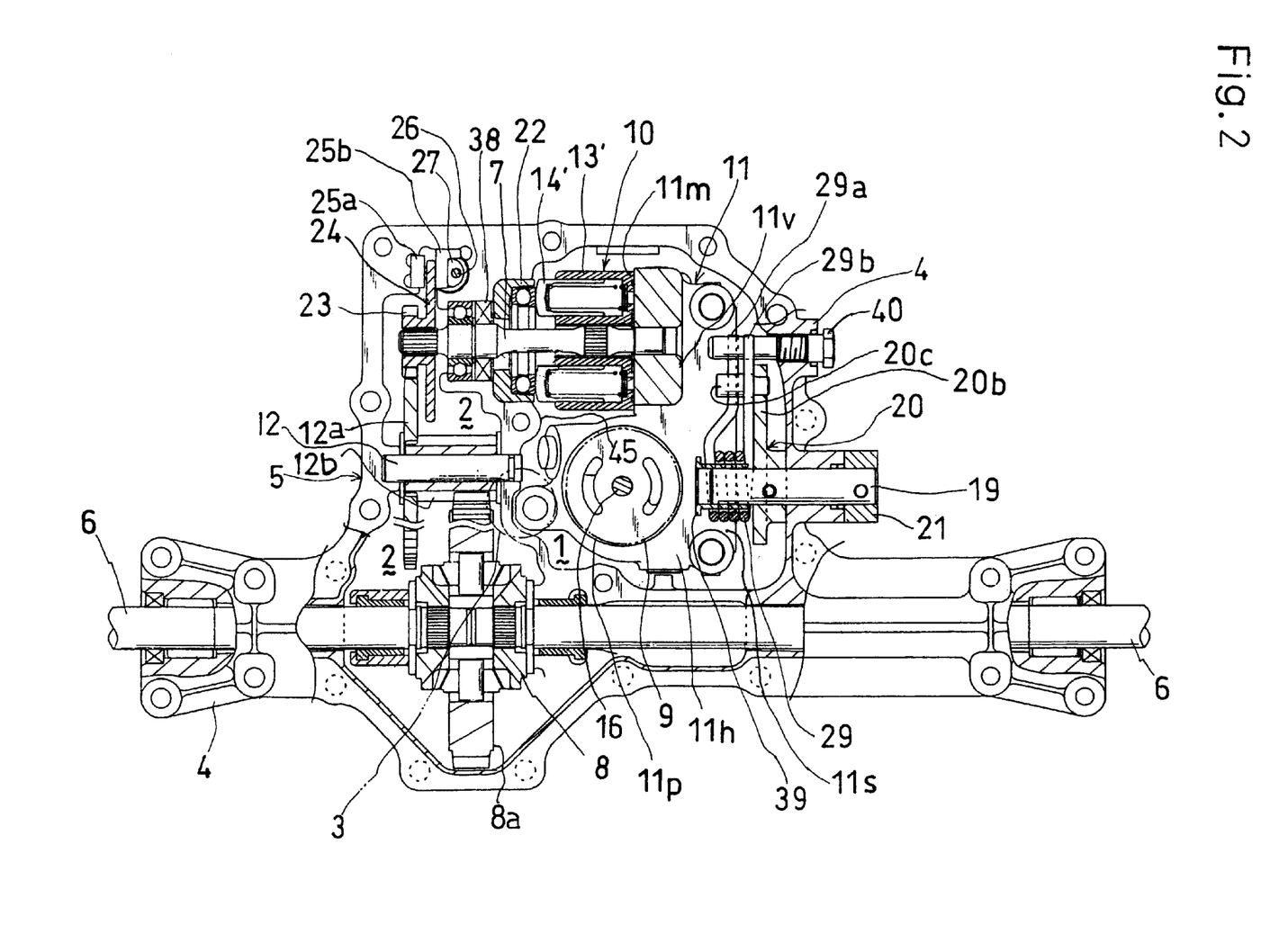
FIG. 2 is a sectional plan view of an axle driving apparatus of the present invention.
Figure 3:
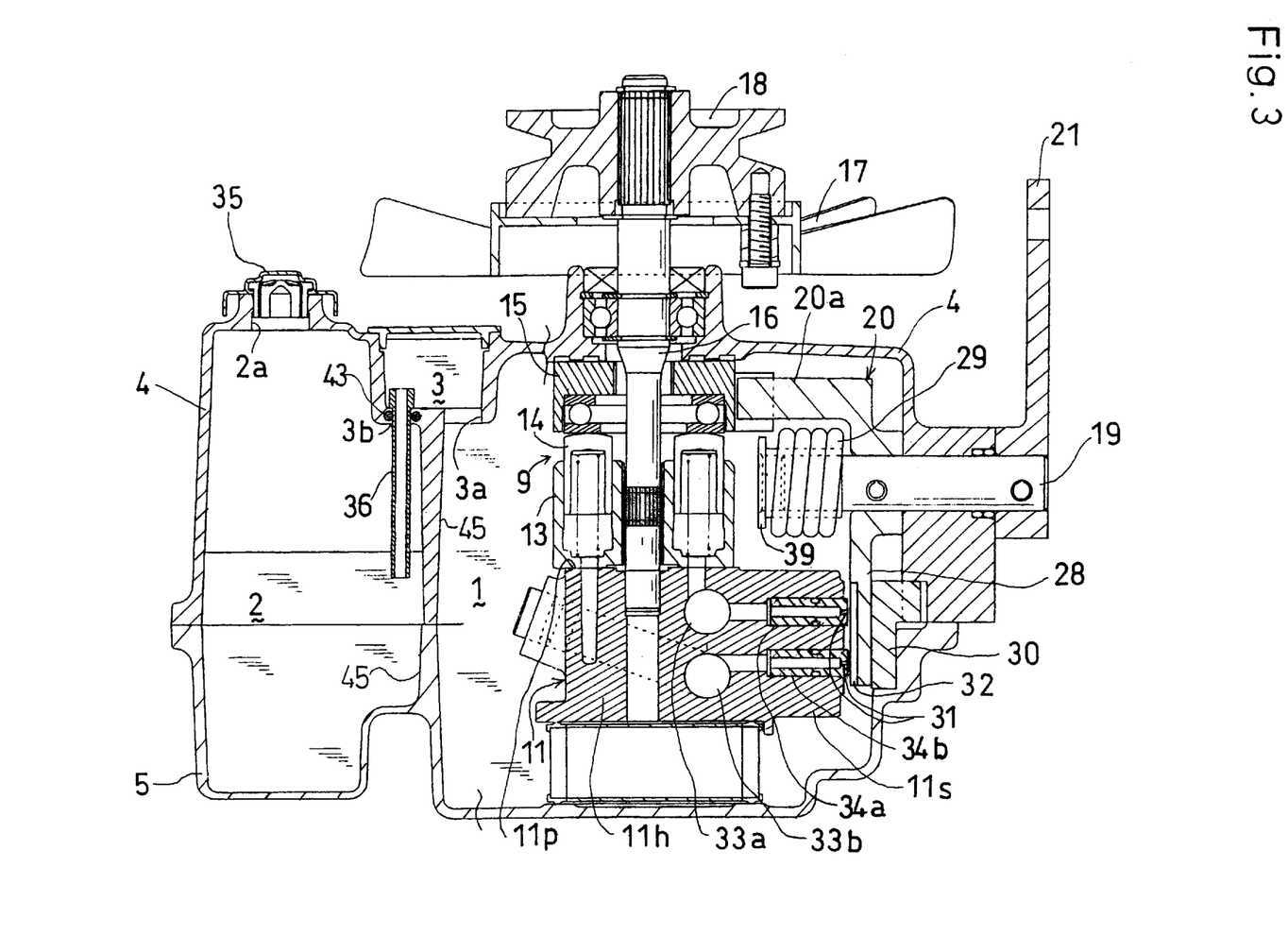
FIG. 3 is a sectional side view of an axle driving apparatus of the present invention.

Next, description will be given on a construction of axial piston type hydraulic pump 9 and its surrounding, As shown in FIGS. 2 and 3, center section 11 fixedly disposed in first oil sump 1 integrally forms a horizontal portion 11h having a pump mounting surface 11p on its upper surface and a vertical portion 11v. FIG. 3 shows that cylinder block 13 of hydraulic pump 9 is rotatably and slidably mounted onto pump mounting surface 11p. Pistons 14 are reciprocally inserted into a plurality of cylindrical holes with respective biasing springs. A movable swash plate 15 abuts against the heads of pistons 14. An input shaft 16, which is also a pump shaft, is disposed along the axis of rotation of cylinder block 13 and rotates integrally with cylinder block 13. As shown in FIG. 1, the upper portion of input shaft 16 projects outwardly from the top wall of housing member 4. An input pulley 18 integrally combined with a cooling fan 17 is fixed onto the projecting upper portion of input shaft 16.

The amount and direction of oil discharged from hydraulic pump 9 can be changed by tilting the piston-abutting surface of movable swash plate 15 relative to the rotational axis of cylinder block 13.

Next, description will be given on a tilting mechanism of movable swash plate 15 and a neutral position control mechanism thereof in accordance with FIGS. 1 to 3. A control shaft 19 is rotatably and laterally supported by the side wall of upper housing member 4. A control arm 20, fixedly provided on the control shaft 19, engages with the side surface of movable swash plate 15 in first oil sump 1. Control shaft 19 extends outwardly through the side wall of upper housing member 4. Control lever 21 which is connected to manually operable speed control means through a link mechanism, is fixedly provided on the outer end of control shaft 19. The speed control means such as a pedal or a lever is disposed around a driver's seat of a vehicle.

Control arm 20 integrally forms a first arm 20a, a second arm 20b and a braking plate 28. as shown in FIG. 3, first arm 20a projects upwardly from the boss of control arm 20 into which control shaft 19 is fixedly inserted. Braking plate 28, which looks like a fan when viewed in side, projects downwardly from the boss of the same. As shown in FIG. 2, second arm 20b projects forwardly the boss of the same.

First arm 20a is bent horizontally toward movable swash plate 15 near the upper wall of housing member 4, and the utmost end of first arm 20a engages with the side surface of movable swash plate 15.

Projection 20c projects from the front end of second arm 20b toward center section 11. A neutral return spring 29, which is preferably metallic, is coiled around the inward end portion of control shaft 19 and extends both ends as two upper and lower lines 29a and 29b substantially forwardly in parallel. Projection 20c and a neutral adjust bolt 40 are sandwiched between upper and lower lines 29a and 29b.

Due to the construction mentioned above, control arm 20 and control shaft 19 are integrally rotated by manual operation of the speed control means so as to tilt swash plate 15 with first arm 20a of control arm 20, thereby changing the amount and direction of oil discharged from hydraulic pump 9. The rotation of control arm 20 by operation of the speed control means causes projection 20c of second arm 20b to be integrally rotated so as to push down line 29a or push up line 29b. While one of lines 29a and 29b is pushed down or up by projection 20c, the other is retained by neutral adjust bolt 40, whereby both lines 29a and 29b are outstretched, thereby generating biasing force for returning swash plate 15 to its neutral position. When the operating force on the speed control means is released, the one of lines 29a and 29b which has been pushed down or up by projection 20c returns together with projection 20c to their original positions, so that swash plate 15 returns to its neutral position.

The shank end of neutral adjust bolt 40 disposed between lines 29a and 29b in first chamber 1 is eccentric in relative to the threaded portion thereof screwed in the side wall of upper housing member 4 and the head thereof disposed outside the side wall. Accordingly, when the head of bolt 40 is rotated, the rotated threaded portion thereof is laterally moved along its axis in the side wall of upper housing member 4, however, the eccentric shank end thereof is revolved around the axis of threaded portion so as to be changed in its vertical position during its lateral movement, thereby vertically changing the positions of projection 20c and lines 29a and 29b. Thus, the neutral position of movable swash plate 15 can be finely adjusted by rotational operation of neutral adjust bolt 40, so that a vehicle employing the apparatus can surely stop when the speed control means is placed to the neutral position.

Next, description will be given on the construction of axial piston type hydraulic motor 10 and its surrounding with reference to FIG. 2. Hydraulic motor 10 includes a cylinder block 3 rotatably supported on a motor mounting surface 11m which is formed on the side surface of vertical portion 11v of center section 11. A plurality of pistons 14' are reciprocally inserted into a plurality of cylindrical bores of cylinder block 13' with respective biasing springs. The heads of pistons 14' abut against a fixed swash plate 22 fixedly retained in a partition 45 and a motor shaft 7 is integrally disposed along the axis of rotation of cylinder block 13'. One end of motor shaft 7 projects into second oil sump 2 through partition 45. A gear 23 is axially slidably but not relatively rotatably disposed on the end of motor shaft 7 in second oil sump 2. Gear 23 engages with a gear 12a fixed on a transmitting shaft 12. Gear 12b, integrally formed on transmitting shaft 12, engages with an input gear 8a of differential gears 8. Therefore, motor shaft 7 is drivingly connected to differential gears 8 so that the rotation power of the motor shaft 7 is transmitting to axles 6.

Brake disc 24 is formed integrally with gear 23, so as to be rotated integrally with motor shaft 7 and axially slidable on motor shaft 7. Brake pads 25a and 25b are disposed adjacently to brake disc 24, so that they are opposed to each other with respect to brake disc 24. A vertical braking cam shaft 26 is rotatably supported by housing and a semicircular braking cam 27 is fixed onto braking cam shaft 26. Brake pad 25b, which is laterally movably supported, is biased toward braking cam 27 by biasing means (not shown). The right surface of right brake pad 25b normally (while brake is not applied) abuts against the plain side surface of braking cam 270 Braking cam shaft 26 projects above upper housing member 4 so as to be connected to braking operation means such as a pedal or a lever disposed on a vehicle with a link mechanism. When braking cam shaft 26 is rotated by manual operation of the braking operation means for braking, braking cam 27 is rotated so that the circular edge thereof pushes right brake pad 25b into contact with brake disc 24. Accordingly, brake disc 24 slides along motor shaft 7 so as to be pressed against left brake pad 25a retained by the inner wall of upper housing member 4, thereby braking motor shaft 7 by frictional force of brake pads 25a and 25b.

Next description will be given on the construction of center section 11, which includes oil passages which hydraulically connect hydraulic pump 9 and hydraulic motor 10 with each other. Horizontal portion 11h of center section 11 is laterally expanded so as to constitute an expanded portion 11s, in which a pair of upper and lower cylindrical holes are laterally extended. Pistons 34a and 34b are reciprocally slidably inserted into respective cylindrical holes in expanded portion 11s. The cylindrical holes are connected to oil passage 33a and 33b bored in center section 11, respectively, which fluidly connect hydraulic pump 9 and motor 10 with each other.

The heads of pistons 34a and 34b face braking plate 28 as an integral part of control arm 20. Control shaft 19 is disposed as the pivot of the fan-shape of braking plate 28. The angle of the fan-shape is equal to or greater than the whole range of tilting angle of control arm 20, so that both the heads of pistons 34a and 34b constantly face braking plate 28 even if control arm 20 is tilted to any angle.

The pressure oil discharged from hydraulic pump 9 is sent to hydraulic motor 10 when movable swash plate 15 of hydraulic pump 9 is tilted from its neutral position. Therefore, one of oil passages 33a and 33b in center section 11 is pressured higher than the other. Which oil passage is higher pressured between those 33a and 33b depends on the tilting direction of movable swash plate 15, in other words, whether the speed control means is operated for forward or backward travelling of a vehicle. For example when oil passage 33a is higher pressured, piston 34a connected to higher pressured oil passage 33a is thrusted outwardly so as to press braking plate 28 against brake pad 30 retained by the inner wall of the housing (lower housing member 5).

When the speed control means operated for either forward or backward travelling of a vehicle is released from the manual operating force, control arm 20 biased by neutral return spring 29 is intended to return to the neutral position. However, returning braking plate 28 is affected by the friction force generated from one of pistons 34a and 34b abutting against braking plate 28, which is outwardly thrusted by the higher pressure of either oil passage 33a or 33b, and brake pad 30, so that the speed of control arm 20 and swash plate 15 returning to their neutral positions is reduced, thereby preventing the vehicle from suddenly stopping.

Furthermore, each of pistons 34a and 34b is bored by an outwardly-opening orifice 31 along its axis, and the piston-abutting surface of braking plate 28 is provided with a narrow slot 32. Slot 32 comes to overlap with both orifices 31 when control arm 20 is in vicinity of the neutral position. Accordingly, pressure oil in higher pressured oil passage 33a or 33b is drained into first oil sump 1 through orifice 31 and slot 32 when the speed control means returning to the neutral position comes into vicinity of the neutral position. This causes both oil passages 33a and 33b to become equal regarding their hydraulic pressure, thereby stopping hydraulic motor 10. Therefore, the vehicle can be surely kept stopped even if there is a slight error of neutral-positioning accuracy in any part of the series of linkage from the speed control means to swash plate 15.

When control arm 20 is rotated from the neutral position by operation of the speed control means, braking plate 28 is integrally rotated, so that slot 32 moves apart from orifices 31 of pistons 34a and 34b. Further, one of pistons 34a and 34b, in communication with either higher pressured oil passage 33a or 33b, comes to abut against the flat surface of braking plate 28 while its orifice 31 is shut up to first oil sump 1, thereby ensuring the increase of hydraulic pressure in either oil passage 33a or 33b without oil-drain Also, the friction force generated between piston 34a or 34b and braking plate 28 abutting against each other causes the speed control means to be moderately loaded for its manual operation, thereby enabling the vehicle to be restrainedly accelerated.

In the housing is ensured a free space above lateral expanded portion 11s of center section 11, which is available for disposal of control shaft 19 with neutral return spring 29 wound therearound.

Next, description will be given on some embodiments about the oil sump construction of the apparatus as the principal part of the present invention in accordance with FIGS. 3 to 7. As mentioned above, first oil sump 1 is separated form second oil sump 2 by partition 45. For a common construction among the embodiments shown in FIGS. 3 to 7, an oil pouring port 2a of second oil sump 2, which is covered with a breather cap 35, is disposed on the upper wall of housing member 4 so as to make the upper air space in second oil sump 2 communicate with the outside air therethrough. First oil sump 1 is separated from the outside air completely.

Referring to FIG. 3, a third oil sump 3 which stores a little oil is formed by upper housing member 4 above the top of partition 45. Third oil sump 3 is bored through its bottom by openings 3a and 3b. Opening 3a is communicated to the upper portion of first oil sump 1, and opening 3b is communicated to second oil sump 2. A pipe 36 is downwardly extended from opening 3b into the oil in second oil sump 2, so that the lower end of pipe 36 is constantly placed below the oil level of second oil sump 2. An oil sealing 43 is interposed between opening 3b and pipe 36. Therefore, a siphon is formed between first and second oil sumps 1 and 2.

First and third oil sump 1 and 3 enclosed by the housing is substantially filled with oil for operation of the HST and lubrication. Oil is poured into second oil sump 2 so that the oil level of second oil sump 2 is lower than that of third oil sump 3. When the oil is expanded because of the rising of oil temperature in first oil sump 1 by working of the HST, the amount of increased oil in first oil sump 1 is sent to second oil sump 2 through opening 3a, third oil sump 3 and pipe 36 in order. Inversely, when the volume of the oil is reduced by falling down of the oil temperature in first oil sump 1, oil in second oil sump 2 returns to first oil sump 1 through pipe 36, third oil sump 3 and opening 3a in order. In other words, second oil sump 2, which is a chamber enclosing differential gearing 8, other transmission gears and so on, takes the place of a reservoir tank separated from the apparatus.

As shown in FIG. 2, motor shaft 7 of hydraulic motor 10, extended from first oil sump 1 to second oil sump 2 through partition 45, is journalled by a bearing disposed in partition 45, so that there is no fear of fluid communication through the bearing both oil sumps 1 and 2. If there is somewhat of an oil-path between first and second oil sumps 1 and 2, leak of oil is generated therethrough so as to reduce the efficiency of the above-mentioned siphon. Therefore, first oil sump 1 must be completely separated from second oil sump 2 and enclosed completely. From this view point, as shown in FIG. 2, an oil sealing 38 is disposed in partition 45 adjacently to the bearing for motor shaft 7, thereby avoiding fluid communication between first and second oil sump 1 and 2. Oil sealing 3 8 is employed in common by the embodiments discussed below shown in FIGS. 4 to 7.

Figure 4:
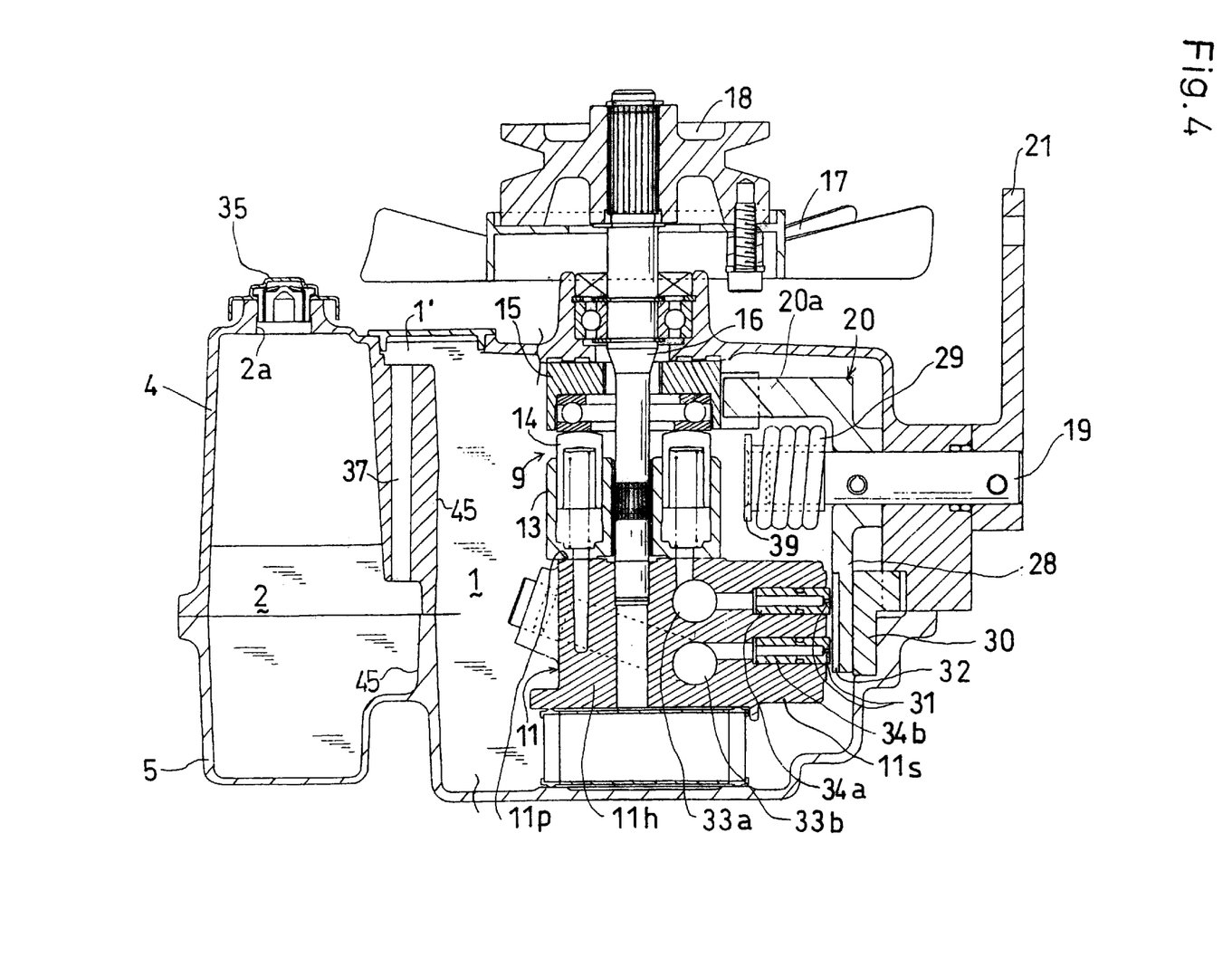
FIG. 4 is a sectional side view of an alternative embodiment including a siphon formed of an oil passage in place of a pipe.

Referring to FIG. 4, partition 45 which separates first oil sump 1 from second oil sump 2 is formed of a thick wall. The upper area of first oil sump 1 laterally projects above second oil sump 2 near the upper wall of housing member 4, thereby forming a projection area 1'. An oil passage 37 is substantially vertically bored through partition 45. The top open end of oil passage 37 communicates with the bottom of projection area 1'. The lower open end of oil passage 37 communicates with second oil sump 2, so that the lower end is constantly placed below the oil level of second oil sump 2. Resulting oil passage 37 acts as a siphon. In this arrangement, projection area 1' takes the place of third oil sump 3 of the above embodiment shown in FIG. 3.

Figure 5:
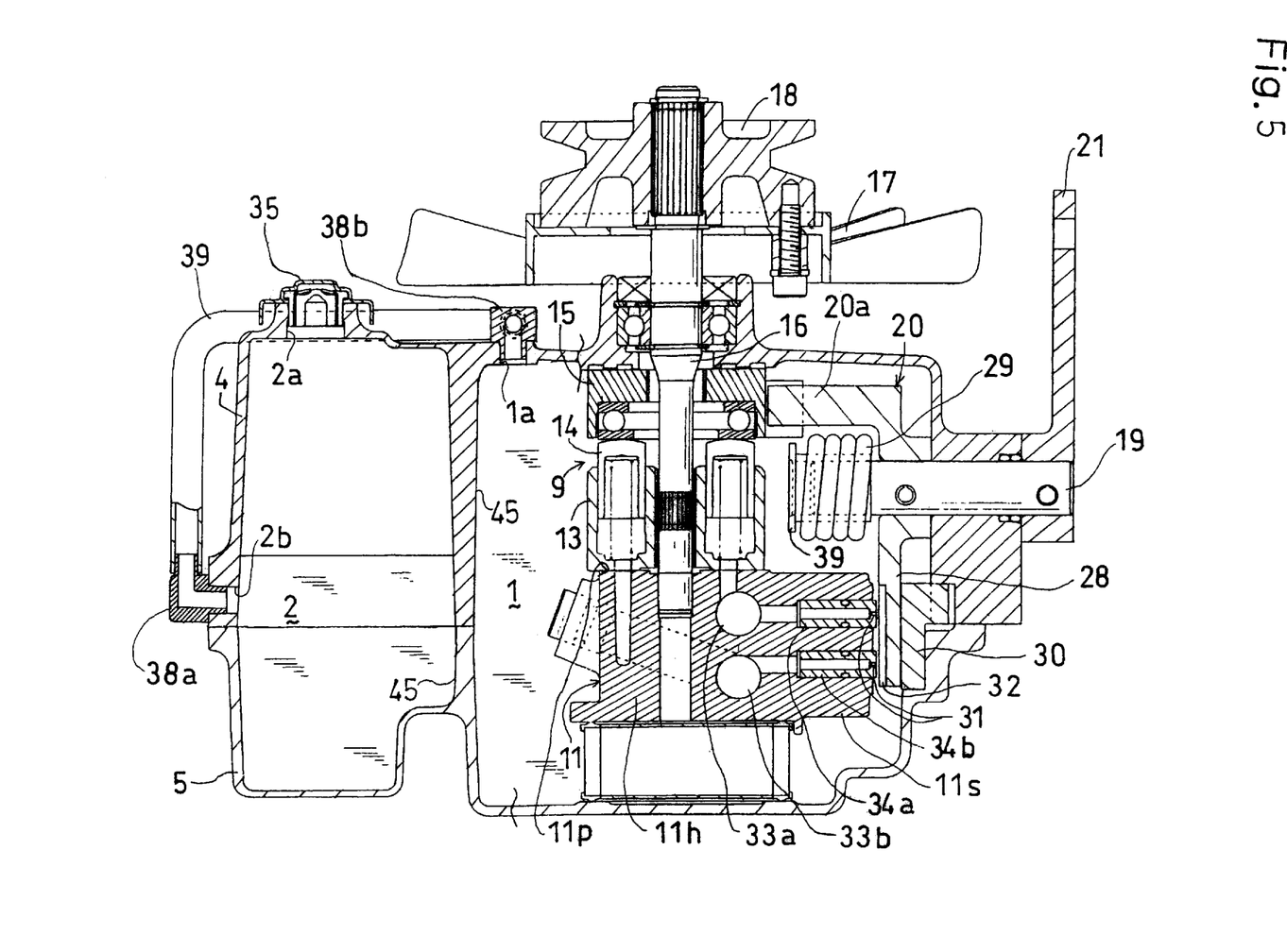
FIG. 5 is a sectional side view of an alternative embodiment including a siphon formed of a tube connecting the first and the second oil sump.

Alternatively, referring to FIG. 5, housing, member 4 is provided at its top wall facing first oil sump 1 with an outward opening 1a and at its side wall facing second oil sump 2 with an outward opening 2b, An L-like shaped first joint pipe 3a is fixedly inserted into opening 2b, and an L-like shaped second joint pipe 38b is fixedly inserted into opening 1a, Both first and second pipes 38a and 38b project outwardly and are connected,with each other through a tube 39. Opening 2b is constantly placed below the oil level of second oil sump 2, so that the above-mentioned effect like a siphon is ensured. In this arrangement, third oil sump 3 is not required, so that the interior construction of the housing becomes simple.

Figure 6:
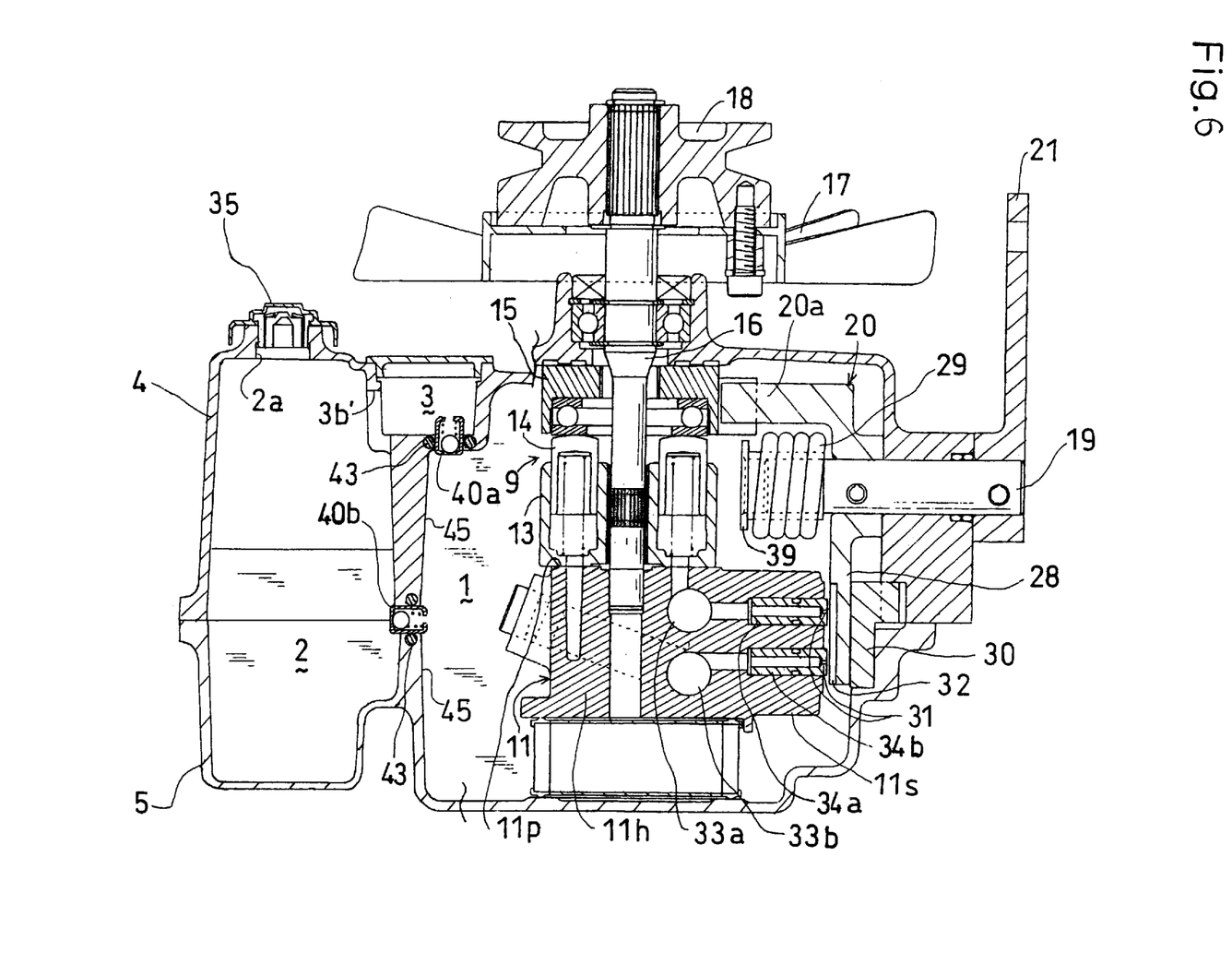
FIG. 6 is a sectional side view of an alternative embodiment including two chick valve adjusting the volume of oil.

Alternatively, referring to FIG. 6, third oil sump 3 is provided similarly to that shown in FIG. 3. A first check valve 40a is interposed between first and third oil sumps 1 and 3 through a partition (namely, the bottom of third oil sump 3) separating third oil sump 3 from first oil sump 1, and a second check valve 40b is interposed between first oil sump 1 and second oil sump 2 through partition 45.

First check valve 40a enables oil to flow only from first oil sump 1 to third oil sump 3, and second check valve 40b enables oil to flow only from second oil sump 2 to first oil sump 1 . Oil sealing 43 and 43 are closely disposed around first and second check valve 40a and 40b to prevent oil leak.

Due to such construction as stated above, when oil in first oil sump 1 rises in its temperature so as to be expanded, the amount of increased oil in first oil sump 1 is sent to third oil sump 3 through first check valve 40a (it is not directly sent to second oil sump 2 through second check valve 40b because second check valve 40b can be only inversely opened), and finally sent to second oil sump 2 through an opening 3b' bored through a partition between second and third oil sumps 2 and 3. Inversely, when the oil in first oil sump 2 is returned to first oil sump 1 through second check valve 40b.

Figure 7:
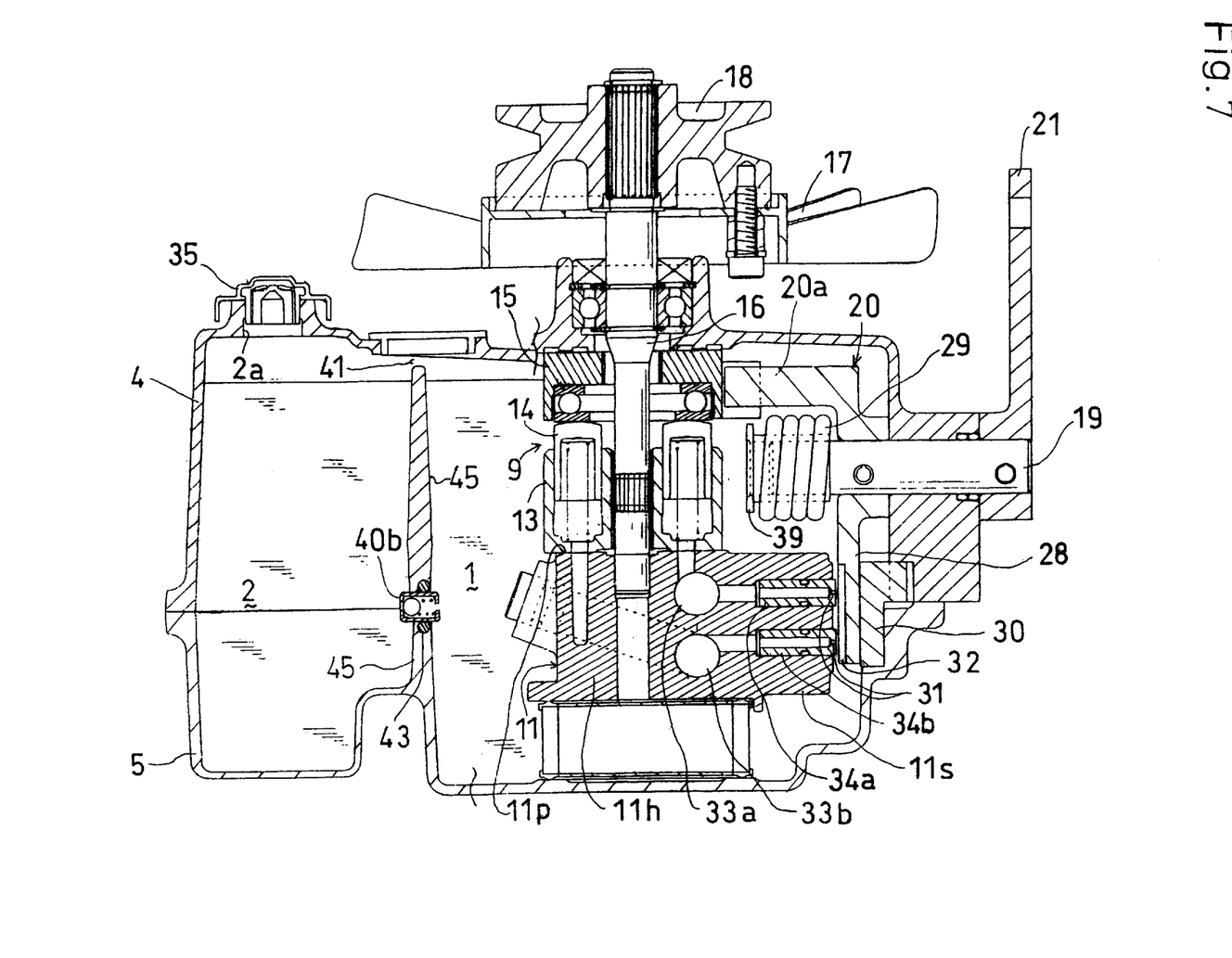
FIG. 7 is a sectional side view of an alternative embodiment including a one check valve adjusting the volume of oil.

Alternatively, referring to FIG. 7, a clearance 41 is formed between the upper wall of housing member 4 and the tip of partition 45 so as to make first and second oil sumps 1 and 2 fluidly communicate with each other. Only one check valve 40b, which enable oil to flow only from second oil sump 2 to first oil sump 1, is disposed through the lower portion of partition 45. In this arrangement, second oil sump 2 is filled with enough oil so that its oil level becomes the same with that of first oil sump 1 when the axle driving apparatus is installed horizontally.

Therefore, when the oil in first oil sump 1 is expanded because of its temperature rising, excessive oil in first oil sump 1 overflows therefrom into second oil sump 2 through clearance 41. Inversely, when the volume of oil in first oil sump 1 is reduced because its falling of temperature, the oil level in first oil sump 1 becomes lower than that in second oil sump 2, however, the oil in second oil sump 2 flows into first oil sump 1 through check valve 40b, which is opened because of difference between the pressure of first and second oil sumps 1 and 2, thereby making both the oil levels equal.

What is claimed is:

1. An axle driving apparatus comprising:

a hydrostatic transmission comprising a hydraulic pump and a hydraulic motor fluidly connected with each other;

an axle having a lateral axis of rotation;

a transmitting mechanism for transmitting power from said hydraulic motor to said axle;

a housing for housing said hydrostatic transmission, said axle and said transmitting mechanism;

a first oil sump and a second oil sump formed in said housing, wherein said hydrostatic transmission is disposed in said first oil sump, and said axle and said transmitting mechanism are disposed in said second oil sump;

communication means interposed between said first oil sump and said second oil sump, wherein said communication means makes oil flow therethrough from said first oil sump to said second oil sump when oil in said first oil sump is expanded over the volume of said first oil sump, wherein a first opening of said communication means communicating with said first oil sump is disposed above the oil level of said second oil sump, and a second opening of said communication means communicating with said second oil sump is disposed below the oil level of said second oil sump.

2. The axle driving apparatus according to claim 1, wherein said first oil sump is separated from the outside air, said second oil sump is communicated with the outside air.

3. The axle driving apparatus according to claim 1, further comprising:

a partition formed in said housing for separating said first oil sump and said second oil sump from each other;

a third oil sump for constituting a part of said communication means, wherein said third oil sump is formed in said housing above said partition; and a conduit for constituting a part of said communication means, wherein said conduit is extended in said second oil sump from said third oil sump so that a lower end of said conduit is defined as said second opening end of said communication means.

4. The axle driving apparatus according to claim 1, further comprising:

a partition formed in said housing for separating said first oil sump and said second oil sump from each other; and an oil passage bored through said partition for constituting said communication means, wherein said oil passage has vertical difference between its both open ends, so that an upper open end of said oil passage is defined as said first opening end of said communication means and lower open end of said oil passage is defined as said second opening end of said communication means.

5. The axle driving apparatus of claim 1, wherein said communication means includes a first joint pipe connected to said first sump and second joint pipe connected to said second sump, and wherein a tube connects said first joint pipe and said second joint pipe.

6. An axle driving apparatus comprising:

a hydrostatic transmission comprising a hydraulic pump and a hydraulic motor fluidly connected with each other;

an axle having a lateral axis of rotation;

a transmitting mechanism for transmitting power from said hydraulic motor to said axle;

a housing for housing said hydrostatic transmission, said axle and said transmitting mechanism;

a first oil sump and a second oil sump formed in said housing, wherein said hydrostatic transmission is disposed in said first oil sump, and said axle and said transmitting mechanism are disposed in said second oil sump;

communication means interposed between said first oil sump and said second oil sump, wherein said communication means makes oil flow therethrough from said first oil sump to said second oil sump when oil in said first oil sump is expanded over the volume of said first oil sump;

a partition formed in said housing for separating said first oil sump and said second oil sump from each other;

a first valve means for enabling oil to flow only from said first oil sump to said second oil sump; and a second valve means for enabling oil to flow only from said second oil sump to sad first oil sump, wherein said second valve means is disposed below the oil level in sad second oil sump.

7. The axle driving apparatus of claim 6, wherein said first oil sump is separated from the outside air, and said second oil sump is communicated with the outside air.

8. An axle driving apparatus comprising:

a hydrostatic transmission comprising a hydraulic pump and a hydraulic motor fluidly connected with each other;

an axle having, a lateral axis of rotation;

a transmitting mechanism for transmitting power from said hydraulic motor to said axle;

a housing for housing, said hydrostatic transmission, said axle and said transmitting mechanism;

a first oil sump and a second oil sump formed in said housing, wherein said hydrostatic transmission is disposed in said first oil sump, and said axle and said transmitting mechanism are disposed in said second oil sump;

communication means interposed between said first oil sump and said second oil sump, wherein said communication means makes oil flow therethrough from said first oil sump to said second oil sump when oil in said first oil sump is expanded over the volume of said first oil sump, a partition formed in said housing, for separating said first oil sump and said second oil sump from each other;

a clearance for constituting said communication means formed in said housing above said partition so as to make said first oil sump and said second oil sump communicating with each other therethrough; and a valve means enabling oil flow only from said second oil sump to said first oil sump, and said valve means is placed below the oil level in said second oil sump.

* * * * *